United States Patent

[11] 3,607,744

| [72] | Inventor | Arnold George Cottrell<br>Northwich, England |
|---|---|---|
| [21] | Appl. No. | 796,178 |
| [22] | Filed | Feb. 3, 1969 |
| [45] | Patented | Sept. 21, 1971 |
| [73] | Assignee | Imperial Chemical Industries Limited<br>London, England |
| [32] | Priority | Feb. 26, 1968 |
| [33] | | Great Britain |
| [31] | | 9204/68 |

[54] PREPARATION OF FIRE-EXTINGUISHING MATERIAL COMPRISING HEATING A MIXTURE OF UREA AND AN ALKALI METAL BICARBONATE CARBONATE SESQUICARBONATE OR HYDROXIDE
6 Claims, No Drawings

| [52] | U.S. Cl. | 252/7, 252/2, 260/553 |
|---|---|---|
| [51] | Int. Cl. | A62d 1/00, C07c 127/00 |
| [50] | Field of Search | 252/2, 7; 117/137; 106/15 FP; 260/553, 553 C |

[56] References Cited
UNITED STATES PATENTS
3,484,372  12/1969  Birchall.......................... 252/2
OTHER REFERENCES
Perry, John H. Chemical Engineer's Handbook, McGraw Hill, 1963 Page 15-5

*Primary Examiner*—John T. Goolkasian
*Assistant Examiner*—D. J. Fritsch
*Attorney*—Cushman, Darby & Cushman ABSTRACT: Improved yields of fire-extinguishing compounds having the empirical formula $MC_2N_2H_3O_3$ where M is Na or K, and made by heating urea with carbonates, bicarbonates, sesquicarbonates or hydroxides of sodium or potassium at temperatures below 150° C., are obtained by having water vapor present in the atmosphere in contact with the reaction system. The preferred proportion of water vapor is 15% to 35% by volume and the preferred reaction temperature 120° C. to 140° C.

PREPARATION OF FIRE-EXTINGUISHING MATERIAL COMPRISING HEATING A MIXTURE OF UREA AND AN ALKALI METAL BICARBONATE CARBONATE SESQUICARBONATE OR HYDROXIDE

This invention relates to an improved process for making a fire-extinguishing material having the ability to extinguish flames arising from the combustion of liquid and gaseous fuels such as liquid hydrocarbons, hydrogen, methane and of solid fuels such as wood, paper and textiles.

We have earlier described compounds for use in extinguishing fires having the empirical formula $MC_2N_2H_3O_3$, where M represents an atom of sodium or potassium, and a process for making them comprising heating a mixture of urea and at least one alkali selected from bicarbonates, carbonates, sesquicarbonates and hydroxides of sodium and potassium at temperatures below 150° C., preferably from 110° C.–120° C.

We have now found that improved yields of the fire-extinguishing compounds are obtained if water vapor is present in the urea/alkali reaction system. The improvement is particularly marked when the alkalis are the carbonates.

Thus in its general form the invention provides an improved process for making compositions of matter possessing fire-extinguishing properties comprising heating a mixture of urea and at least one alkali selected from bicarbonates, carbonates, sesquicarbonates and hydroxides of sodium and potassium at temperatures below 150° C characterized in that water vapor is present in contact with the mixture whilst the latter is being heated.

In one particular form of the invention a mixture of potassium carbonate and urea, or of sodium carbonate and urea is heated at temperatures below 150° C., preferably from 120° C. to 140° C., in contact with an atmosphere containing at least 5%, preferably 20–35%, volume/volume of water vapor.

In another particular form of the invention a mixture of potassium bicarbonate and urea, or of sodium bicarbonate and urea, is heated at temperatures below 150° C., preferably 120° C. to 140° C., in contact with an atmosphere containing at least 5%, preferably 15–30%, volume/volume of water vapor.

We have also found that if a minor proportion of water, for example from 1% to 10% by weight, be added to a mixture of potassium carbonate and urea before the mixture is heated at 120° C. to 140° C. in contact with an atmosphere containing water vapor the rate of the reaction that produces the fire-extinguishing composition is increased.

Thus another particular form of the invention comprises heating a mixture of potassium carbonate and urea and a minor proportion of water at a temperature of 120° C. to 140° C. in contact with an atmosphere containing at least 5%, preferably 15–25%, volume/volume of water vapor.

The proportions of urea and alkali are conveniently within the range of one mole of alkali to from about 0.75 to 3.0 moles of urea. The higher proportions of urea are preferably used when the alkali is potassium carbonate or sodium carbonate, for example 2.75 to 3.0 moles of urea per mole of carbonate. With the bicarbonates approximately equimolar proportions with urea are suitable though minor variations on either side of a 1:1 molar ratio have no substantial effect on reaction yield.

The invention is illustrated by a series of experiments whose results are summarized in the table. The various mixtures in powder form were supported on trays at approximately 0.75 to 3.5 lbs. of mixture to the square foot, and heated under the conditions shown in the table in ovens having controllable humidities and temperatures.

Compaction of the mixed powders improves the yield of fire-extinguishing composition when a mixture of dry potassium bicarbonate and dry urea is heated in a dry atmosphere but has little effect on yield when such a mixture is heated in an atmosphere containing water vapor, in fact with either potassium carbonate or bicarbonate compaction does not appear to be necessary to obtain high yields provided the required amount of water vapor is present in contact with the mixture whilst it is being heated. The column headed $H_2O$ shows the proportion of water as such present in the reaction mixture. The column headed humidity shows the proportion by volume of water vapor present in the atmosphere in contact with the reaction system. The column headed % $MC_2N_2H_3O_3$ in product by weight shows the percent by weight of $KC_2N_2H_3O_3$ or $NaC_2N_2H_3O_3$ when the alkali is respectively a potassium or sodium alkali.

TABLE

| Alkali | Mole ratio alkali=1 | | Temp., °C. | Humidity, percent $H_2O$ v./v. | Time, minutes | Percent $MC_2N_2H_3O_3$ in product by weight |
|---|---|---|---|---|---|---|
| | Urea | $H_2O$ | | | | |
| $KHCO_3$ | 1.05 | | 130 | 4.0 | 60 | 50.0 |
| | 1.05 | | 131 | 12.0 | 60 | 59.2 |
| | 1.05 | | 130 | 15.5 | 60 | 71.1 |
| | 1.05 | | 129 | 16.5 | 60 | 71.2 |
| | 1.00 | | 135 | 25.0 | 60 | 91.0 |
| $K_2CO_3$ | 3 | 0 | 127 | Nil | 80 | 30.0 |
| | 3 | 0 | 127 | 1.0 | 80 | 41.1 |
| | 3 | 0 | 127 | 17.0 | 80 | 82.3 |
| | 3 | 0 | 140 | 35.0 | 150 | 90.5 |
| | 3 | 1 | 129 | 14.6 | 30 | 62.9 |
| | 3 | 1 | 129 | 15.0 | 45 | 79.2 |
| | 3 | 0.2 | 129 | 20.0 | 60 | 84.0 |
| | 3 | 0.2 | 129 | 21.6 | 120 | 85.2 |
| $Na_2CO_3$ | 3 | | 140 | 20.0 | 120 | 40.5 |

What we claim is:

1. In a process for making compositions of matter possessing fire-extinguishing properties by heating a mixture of urea and at least one alkali selected from bicarbonates, carbonates, sesquicarbonates and hydroxides of sodium and potassium at temperatures from 120° C. to below 150° C., the improvement comprising heating the said mixture in the presence of an atmosphere containing at least 5% by volume of water vapor.

2. A process as claimed in claim 1 in which the alkali is selected from sodium carbonate and potassium carbonate and the reaction temperature is from 120° C. to 140° C.

3. A process as claimed in claim 2 in which the percentage by volume of water vapor in the atmosphere in contact with the reaction mixture of urea and alkali is from 20 to 35.

4. A process as claimed in claim 1 in which the alkali is selected from sodium bicarbonate and potassium bicarbonate and the reaction temperature is 120° C. to 140° C.

5. A process as claimed in claim 4 in which the percentage by volume of water vapor in the atmosphere in contact with the reaction mixture of urea and alkali is 15 to 30.

6. A process as claimed in claim 1 in which the alkali is potassium carbonate, and the reaction temperature is 120° C. to 140° C., and the percentage by volume of water vapor in the atmosphere in contact with the reaction mixture of urea and potassium carbonate is from 15 to 25, and to said reaction mixture is added from 1% to 10% by weight of water before the mixture is heated to the said reaction temperature.